Jan. 12, 1943.    S. G. JOHNSON    2,308,011
LEAD TESTER FOR SCREW THREADS
Filed May 10, 1941
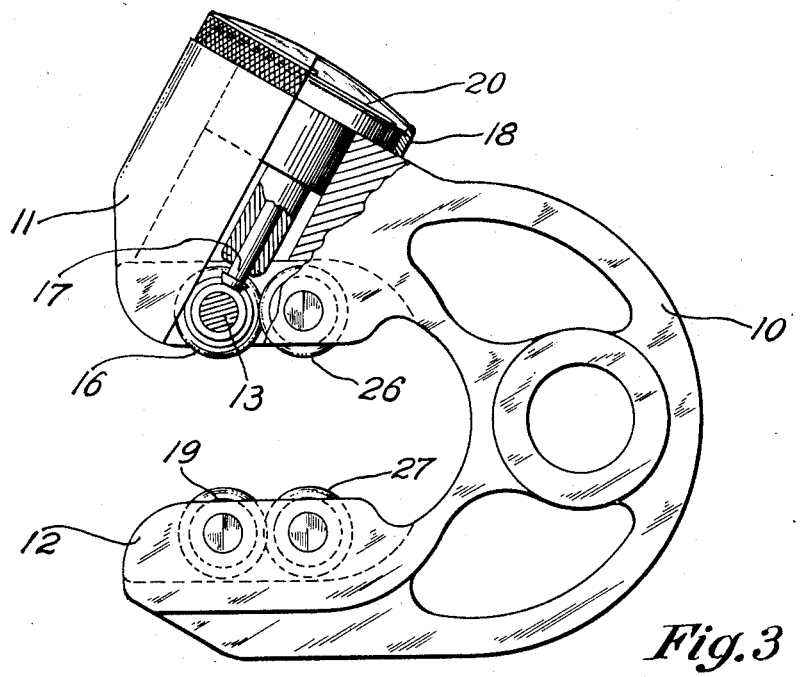
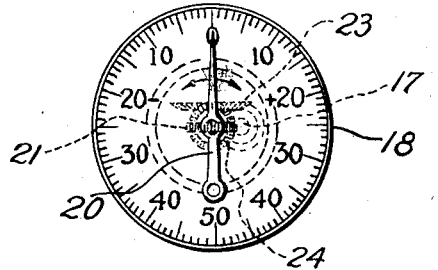
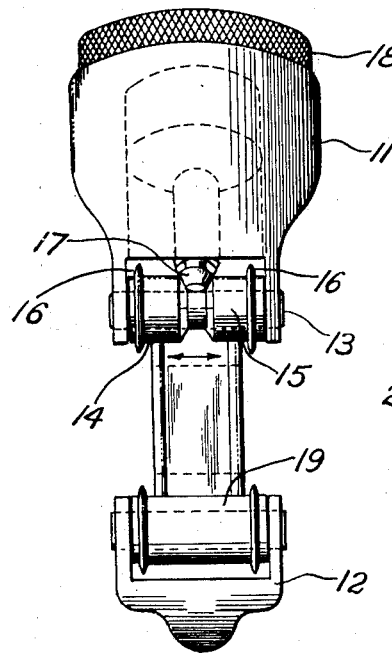
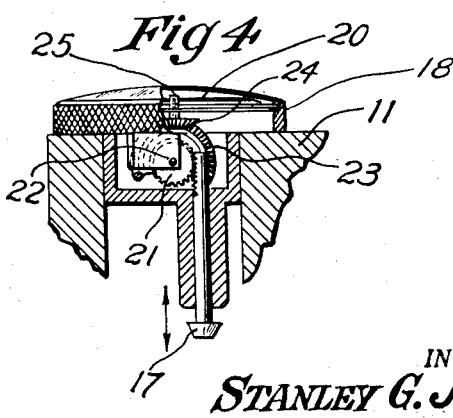
INVENTOR
STANLEY G. JOHNSON
BY Joseph M. Schofield
ATTORNEY Patented Jan. 12, 1943

2,308,011

UNITED STATES PATENT OFFICE 2,308,011

LEAD TESTER FOR SCREW THREADS

Stanley G. Johnson, Hartford, Conn., assignor to Niles-Bement-Pond Company, West Hartford, Conn., a corporation of New Jersey Application May 10, 1941, Serial No. 392,902

6 Claims. (Cl. 33—199)

This invention relates to screw thread gages and particularly to a gage to determine variations in the lead or pitch of external screw threads.

An object of the present invention is to provide a simple hand operated mechanical screw thread gage which may be directly applied to an externally threaded member to determine the correctness of its lead.

One feature that enables me to accomplish the above named object is that the screw threaded member being gaged contacts with spaced projections conforming in cross section to the form of threads, these projections being formed on members slidable toward and from each other while being maintained in alignment with each other, there being means to determine the separation of the projections and members when the member being gaged is in contact therewith.

Another feature of advantage is that means are provided to support the screw threaded member being gaged with its axis parallel to the axes of the slidable members, and finally it is an object to provide a dial indicator having its movable spindle engaging portions of the slidable members so that the separation of the projections and the members on which they are formed may be determined when the member being gaged is in contact therewith.

With the above and other objects in view, the invention includes the features of construction and operation set forth in the following specification and illustrated in the accompanying drawing.

In the accompanying drawing annexed hereto and forming a part of this specification, I have shown the invention embodied in a hand operated screw thread gage for relatively small externally threaded members, but it will be understood that the invention can be otherwise embodied and that the drawing is not to be construed as defining or limiting the scope of the invention, the claims appended to this specification being relied upon for that purpose.

In the drawing:

Figure 1 is a side elevation of a preferred form of the invention, parts being broken away to more clearly indicate their construction.

Fig. 2 is a front elevation taken from the left-hand side of Fig. 1.

Fig. 3 is a plan view of a dial indicator forming a part of the gage shown in Figs. 1 and 2, and Fig. 4 is a central sectional view of the operative parts of the dial indicator shown in Fig. 3.

In the above-mentioned drawing there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, a frame; second, a shaft transversely mounted within one arm thereof; third, members on the shaft preferably in the form of rotatable members so mounted that they may have limited axial slidable movement toward and from each other; fourth, a dial indicator having the outer end of its movable spindle engaging bevelled portions of the adjacent ends of the slidable members to indicate the separation of the members and their projections when a screw threaded member is in contact therewith; fifth, an opposed roller or mounting means for supporting the screw threaded member being gaged in a position so that its axis will be parallel to the axis of the slidable members.

Referring more in detail to the figures of the drawing, I provide a frame 10 having oppositely extending arms 11 and 12 in one of which is mounted a transverse shaft 13. The opening between the arms 11 and 12 of the frame 10 is such that members being gaged may enter. The shaft 13 may be retained in fixed position within its arm 11 by any preferred means (not shown) or may be pressed firmly therein. On this shaft 13 are mounted slidable members 14 and 15 preferably in the form of rollers having annular projections 16 thereon conforming in cross section to the form of screw threads being gaged. Limited movement of the members 14 and 15 is permitted along the shaft 13 between the side walls of the arm 11 within which the shaft 13 is supported.

As will be seen in Fig. 2, adjacent ends of the slidable members 14 and 15 are bevelled and are in contact with the bevelled outer end of the spindle 17 of a dial indicator 18. Normally the spindle 17 is pressed downwardly as seen in Fig. 4 with a light pressure so that it always bears against the adjacent ends of the slidable members 14 and 15 and normally holds them spaced apart as far as permitted by the gap formed in the arm 11 of the frame 10. But one projection 16 is formed on each roller 14 and 15 and as shown in Fig. 2 these projections are spaced apart a substantial distance so that they will engage widely spaced convolutions of the threads being gaged. The projections 16 preferably extend completely around members 14 and 15 and have their side surfaces at angles to correspond to the threads being gaged.

On the opposite arm 12 of the frame 10 may be mounted a roller 19 having two or more suitably spaced projections adapted to engage within the convolutions of the screw thread being gaged so that a threaded work piece may be mounted in position to engage the projections 16 on the slidable members 14 and 15 with its axis maintained parallel to the axis of the shaft 13 on which the slidable members 14 and 15 are mounted.

In operation a threaded member (not shown) is pressed between the rollers or members 14 and 15 so that the projections 16 on these members will be engaged and brought toward each other slightly when the member being gaged is in its gaging position. This relative movement of members 14 and 15 forces the spindle 17 of the dial indicator 18 outwardly a slight distance in a direction away from the slidable members 14 and 15, the amount of this movement being indicated by the rotation of the indicator pointer 20 shown in Fig. 3. While any standard form of dial indicator 18 may be employed, the one shown has been found preferable and includes rack teeth upon the inner end of the movable spindle 17 which engage teeth of a gear 21 on a short transverse shaft 22. This shaft 22 also mounts a bevelled gear 23 in mesh with another bevelled gear 24 on a shaft 25 centrally mounted relative to the dial and to which the indicator pointer 20 is attached. The gearing multiplies the movement of the spindle 17 so that extremely slight differences in separation of the members 14 and 15 and their projections 16, which correspond to variations in lead of the threads being gaged, may be read to a high degree of precision.

If desired a second pair of work engaging rollers 26 and 27 formed to engage the member being gaged may be mounted on the frame adjacent and parallel to the rollers 14, 15 and 19.

What I claim is:

1. A lead testing device for screw threads comprising in combination, a frame, a shaft mounted in an arm thereof, a pair of members thereon slidable toward and from each other, each member having a projection conforming in cross section to the screw threads being gaged, means normally forcing said members away from each other, and means engaging both said members to indicate the separation of said members when a member being gaged is in contact therewith.

2. A lead testing device for screw threads comprising in combination, a frame, a shaft mounted in an arm thereof, a pair of rotatable members thereon slidable toward and from each other, each member having an annular projection conforming to the screw threads being gaged, means normally forcing said members away from each other, and means engaging both said members to indicate the separation of said members when a member being gaged is in contact therewith.

3. A lead testing device for screw threads comprising in combination, a frame, a shaft mounted in an arm thereof, a pair of rollers slidable thereon axially toward and from each other, each member having a projection conforming in cross section to the screw threads being gaged, means normally forcing said rollers away from each other, and means engaging both said members to indicate the separation of said rollers when a member being gaged is in contact therewith.

4. A lead testing device for screw threads comprising in combination, a frame, a shaft mounted in an arm thereof, a pair of members thereon slidable toward and from each other, each member having a projection conforming to the screw threads being gaged, means normally forcing said members away from each other, means engaging adjacent ends of said members to indicate the separation of said rollers when a member being gaged is in contact therewith, and means to support a screw threaded member in contact with said projections with its axis parallel to said shaft.

5. A lead testing device for screw threads comprising in combination, a frame, a shaft mounted in an arm thereof, a pair of rotatable members thereon slidable toward and from each other, said members having their adjacent ends bevelled and each having an annular projection conforming to the screw threads being gaged, means normally forcing said members away from each other, means engaging said adjacent bevelled ends of said members to indicate the separation of said members when a member being gaged is in contact therewith, and means to support a screw threaded member in contact with said projections with its axis parallel to said shaft.

6. A lead testing device for screw threads comprising in combination, a frame, a shaft mounted in an arm thereof, a pair of rollers thereon slidable toward and from each other, said members having their adjacent ends bevelled and each having an annular projection conforming in cross section to the screw threads being gaged, and a dial indicator having its spindle engaging said adjacent bevelled ends of said rollers and normally forcing said rollers apart, whereby the separation of said rollers may be determined when a screw threaded member being gaged is in contact with said projections.

STANLEY G. JOHNSON.